Jan. 15, 1929.   H. W. PORTH   1,699,446

DRY CELL

Filed June 12, 1925

INVENTOR
Henry W. Porth
BY
his ATTORNEY

Patented Jan. 15, 1929.

1,699,446

UNITED STATES PATENT OFFICE.

HENRY W. PORTH, OF BROOKLYN, NEW YORK, ASSIGNOR, BY MESNE ASSIGNMENTS, TO NATIONAL CARBON COMPANY, INC., OF NEW YORK, N. Y., A CORPORATION OF NEW YORK.

DRY CELL.

Application filed June 12, 1925. Serial No. 36,565.

This invention relates to dry batteries and particularly to new and useful improvements in the assembly of a battery of dry cells in a container.

It is the object of the present invention so to provide the dry cells in a casing that they may be connected in series without the necessity of soldering joints and in such a manner that the cells are firmly held against displacement when the battery is subjected to jars.

The dry cells are confined within a casing of suitable size and shape to prevent their lateral displacement. The vertical displacement of the cells is guarded against by means of springs bearing against the top and the bottom, respectively, of the casing and the tops and bottoms of the cells. The springs are preferably flat and insulated from the casing (if the latter is made of metal), and are so arranged that they are used to establish connections between adjacent cells. For the purpose of permitting the use of the shortest possible springs, adjacent dry cells are inserted into the container with their carbon electrodes pointing in opposite directions. The bottom of the container electrode of each cell will therefore be adjacent to the protruding end of the central carbon electrode of the neighboring cell and a short spring may be used for interconnecting the two. Two binding posts are mounted on but insulated from the top of the casing. To these binding posts are attached short leaf springs which contact with the container and central electrodes, respectively, of the two end cells. The binding posts serve to hold in place the contact springs as well as the insulation separating the other springs from the casing.

Figure 1:
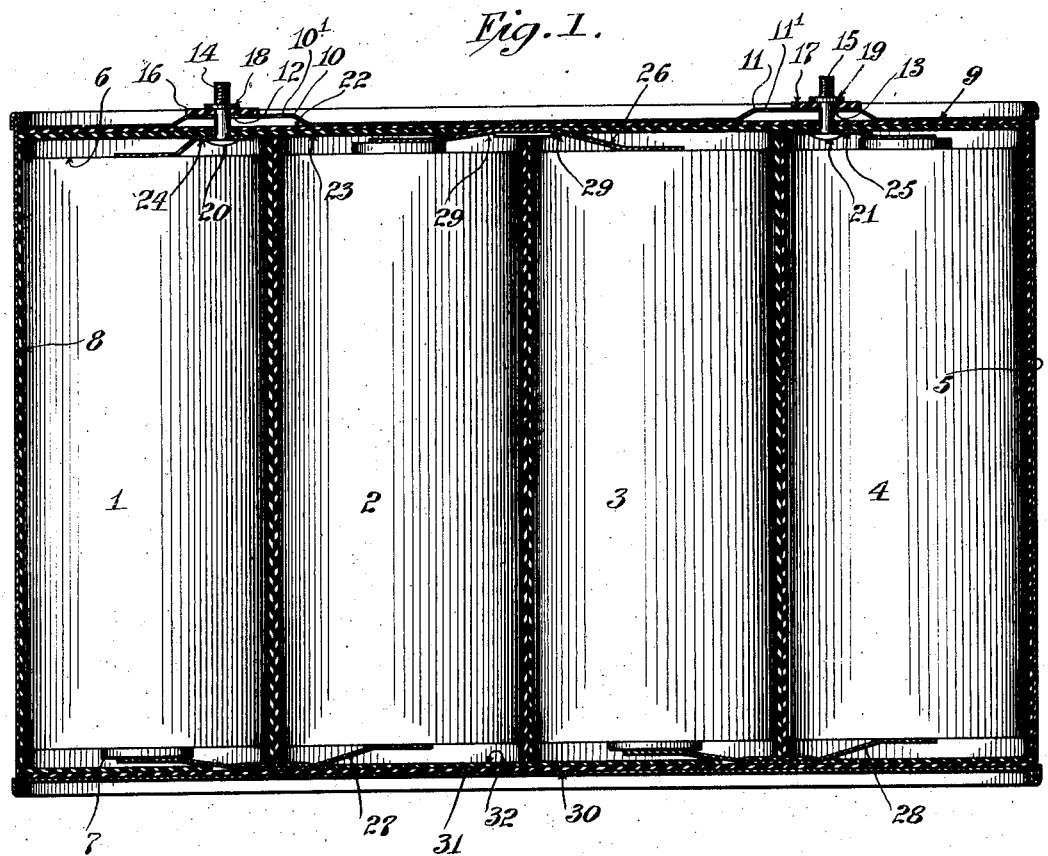
Figure 2:
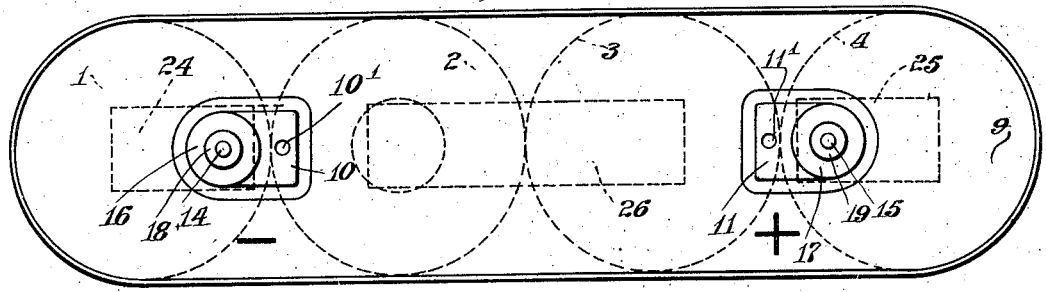

In order more clearly to illustrate the invention, a preferred embodiment thereof will be described in detail with reference to the drawings in which Fig. 1 is a vertical cross-section and Fig. 2 a top plan view of an assembled battery.

Four dry cells 1, 2, 3 and 4 are mounted within a sheet metal casing 5, the contour of which conforms substantially to that of the dry cells and serves therefore firmly to hold the cells against lateral displacement. 1 and 4 are the end and 2 and 3 are the intermediate cells. Each dry cell has a zinc container electrode 6 and a carbon electrode 7 centrally located in the zinc container and separated therefrom by the depolarizing mixture. Each cell is sealed in the usual manner with the end of carbon 7 projecting beyond the seal. The carbon electrodes of adjacent cells point in opposite directions. The zinc container electrode of each cell is enclosed in a tube 8 of insulating material, e. g., paper, so as to insulate the cells from the walls of the casing 6 and from each other. The top 9 of the container has two raised portions 10 and 11 provided with apertures 12 and 13 through which project binding posts 14 and 15. A handle for the battery may be attached to the casing at holes 10' and 11'. The binding posts are insulated from the top 9 by means of suitable washers 16 and 17. The projecting end of each binding post is screw-threaded so as to receive a nut. Shoulders 18 and 19 projecting from the binding posts intermediate their ends rest on the respective insulating washers 16 and 17. The lower ends of the binding posts are headed as indicated at 20 and 21 and between these heads and the shoulders 18 and 19 of each binding post are clamped the insulating washers, the casing top 9 to sheets of insulation 22 and 23, and one end of a flat spring 24 and 25, respectively. The other ends of the springs 24 and 25 are, as clearly illustrated in Fig. 1, bent down to project into a lower plane than the ends held by the binding posts. The free end of spring 24 bears against the bottom of the zinc container of cell 1 and that of spring 25 against the carbon electrode of cell 4. Three contact springs in the form of straps 26, 27 and 28 are provided. The straps are of a flattened U shape with the ends bent sideways. The strap 26 is looped through two perforations in the sheet of paper 23 with one end engaging the carbon terminal of cell 2 and the other end the bottom of the zinc container of cell 3. The sheet of paper 22 insulates the strap 26 from the top 9 of the casing and the paper 23 insulates the central part of the strap from the zinc containers of the cells. Insulation between the containers and the strap is insured also by the wrappers 8 around the cells which extend beyond the ends of the cells. The strap 26 is positioned with respect to the dry cells and held in place by means of the paper sheet 23.

The lower part of the casing 5 is enclosed by a bottom cover 30 on which are positioned two sheets of paper 31 and 32 which, in the manner described in connection with insulating sheets 22 and 23, serve to hold the straps 27 and 28 in place and insulated from the metallic casing as well as the zinc containers of the batteries. The strap 27 connects the carbon electrode of cell 1 with the bottom of the zinc container of cell 2 and the strap 28 connects the carbon electrode of cell 3 with the zinc electrode of cell 4.

Owing to the resiliency of the straps the cells are firmly held in position and good contact is insured with the electrodes and the binding posts. The contact straps are wide and therefore engage the electrodes over a large surface. One of the advantages of this is that slight variations in the spacing of the electrodes and contact straps will not interfere with the assembling operation. It is not necessary to solder joints or exactly to position the cells. Furthermore, since the shocks are absorbed by the spring straps, the resiliency of the casing need not be depended upon for holding the cells in place. This protects the casing against undue strain.

What I claim is:

1. In combination, a metallic casing having metallic top and bottom covers, a row of four zinc-carbon dry cells within said casing alternately reversed with respect to the positioning of the electrodes, two binding posts mounted on the top cover and insulated therefrom, three springs mounted on and insulated from the top cover exerting downward pressure on said cells, one of said springs contacting with one binding post and the zinc electrode of the first cell, the second spring with the other binding post and the carbon electrode of the fourth cell, and the third spring with the carbon electrode of the second and the zinc electrode of the third cell, two springs mounted on and insulated from the bottom cover exerting upward pressure on said cells, one of said two springs contacting with the carbon electrode of the first cell and the zinc electrode of the second cell, and the other spring contacting with the carbon electrode of the third cell and the zinc electrode of the fourth cell.

2. In combination, a plurality of dry cells each having a zinc container and a centrally located carbon electrode, a metallic casing surrounding said cells and holding them against lateral displacement, a metallic top and bottom cover fastened to said casing, two sheets of insulating material lying against each one of said covers, and two flat springs, one held between the top and the other between the bottom sheets of insulating material with their ends projecting through said sheets into engagement with opposite electrodes of said cells, said springs jointly serving resiliently to hold said cells in position within the casing.

3. In combination, a plurality of dry cells each having a zinc container and a centrally located carbon electrode, a sleeve of insulation surrounding each cell, a metallic casing surrounding said cells and holding them against lateral displacement, a metallic top and bottom cover fastened to said casing, two sheets of insulating material lying against said bottom and said top, two binding posts mounted in said top but insulated therefrom and traversing said top and the two sheets of insulation lying below the top, two flat springs having their ends fastened to said posts the free ends of said springs engaging the bottom of the zinc container and protruding end of the carbon electrode, respectively, of two end cells, a leaf spring bent into a flattened U shape with its central portion held between the two sheets of insulation below the top and its protruding ends projecting through the lower top sheet into engagement with the bottom of the zinc can and the protruding end of the carbon electrode, respectively, of two intermediate cells, and two leaf springs bent into substantially flattened U shape with their central portions between the two bottom sheets of insulation and their ends protruding through the upper one of the bottom sheets into engagement, respectively, with the protruding end of the carbon electrode and the bottom of the zinc electrode of one end cell and the cell adjacent thereto, and the other with the bottom of the zinc container of the other end cell and the protruding end of the carbon electrode of the adjacent cell, respectively.

4. In combination, a row of four dry cells each having a zinc container and a centrally located carbon electrode, a sleeve of insulation surrounding each cell and extending slightly above and below the zinc container electrode, a metallic casing surrounding said cells and holding them against lateral displacement, adjacent cells being provided with their carbons pointing in opposite directions, metallic top and bottom covers fastened to said casing, two sheets of insulating material conforming with the shape of said casing lying against said bottom and said top, two binding posts mounted in said top but insulated therefrom and traversing said top and the two sheets of insulation lying below the top, two leaf springs having their ends clamped between heads of said posts and the lower one of said last mentioned insulating sheets, the free ends of said springs being bent into engagement with the bottom of the zinc container and protruding end of the carbon electrode, respectively, of the two end cells, a resilient leaf spring bent into a flattened U shape with its central portion held between the two sheets of insulation below the top and its ends projecting through two openings in the lower top sheet into engagement with the bottom of the zinc can and the protruding end of the carbon electrode, respectively, of the two intermediate cells, and two leaf springs bent into substantially flattened U shape with their central portions between the two bottom sheets of insulation and their ends projecting through the upper one of the bottom sheets into engagement, respectively, with the protruding end of the carbon electrode and the bottom of the zinc electrode of one end cell and the cell adjacent thereto, and the other with the bottom of the zinc container of the other end cell and the protruding end of the carbon electrode of the adjacent cell, respectively.

In testimony whereof, I have signed my name to this specification, this eighth day of June, 1925.

HENRY W. PORTH.